United States Patent [19]

Moehwald

[11] Patent Number: 4,728,399

[45] Date of Patent: Mar. 1, 1988

[54] PREPARATION OF LAMINATES OF METALS AND ELECTRICALLY CONDUCTIVE POLYMERS

[75] Inventor: Helmut Moehwald, Heidelberg, Fed. Rep. of Germany

[73] Assignee: BASF Aktiengesellschaft, Ludwigshafen, Fed. Rep. of Germany

[21] Appl. No.: 830,109

[22] Filed: Feb. 18, 1986

[30] Foreign Application Priority Data

Mar. 2, 1985 [DE] Fed. Rep. of Germany ....... 3507419

[51] Int. Cl.$^4$ ................................................ C25D 5/00
[52] U.S. Cl. ..................................... 204/38.3; 204/78; 204/29
[58] Field of Search .............................. 204/78, 29-30, 204/130, 38.3, 38.1

[56] References Cited

U.S. PATENT DOCUMENTS 4,468,291 8/1984 Naarmann et al. .................. 204/78
4,566,955 1/1986 Naarmann ............................ 204/78
4,569,734 2/1986 Naarmann et al. .................. 204/78

*Primary Examiner*—R. L. Andrews
*Attorney, Agent, or Firm*—Keil & Weinkauf

[57] ABSTRACT

Laminates of metals and electrically conductive polymers are prepared by a process in which first a layer of an electrically conductive polymer is applied onto the surface of the metal by treating the monomers with an oxidizing agent, the metal coated in this manner is immersed in a solution which contains an anodically polymerizable monomer and a conductive salt, and the monomer is anodically polymerized so that it is deposited onto the coated metal.

4 Claims, No Drawings

PREPARATION OF LAMINATES OF METALS AND ELECTRICALLY CONDUCTIVE POLYMERS

The present invention relates to a process for the preparation of laminates of metals and electrically conductive polymers, in which first a layer of a conductive polymer is applied onto the metal by treating the monomers with an oxidizing agent, and then an electrically conductive layer is applied onto the metal coated in this manner, by anodic polymerization of the monomers.

According to A. F. Diaz et al., J. Chem. Soc. Chem. Comm. 1979, page 635; J. Chem. Soc. Chem. Comm. 1979, page 854 and ACS Org. Coat. Plast. Chem. 43 (1980), the anodic polymerization of pyrrole in the presence of a conductive salt gives films having electrical conductivities of up to $10^2$ S/cm. These are p-conductive polypyrroles, particular examples of counter ions being $BF_4^-$, $SbF_6^-$, $CLO_4^-$ and $HSO_4^-$.

According to K. C. Khulke and R. S. Mann, J. Polym. Sci. 20 (1982), 1089–1095, pyrrole can be polymerized in aqueous solution in the presence of potassium persulfate so that the polymer separates out in the form of a finely divided black powder.

When electrically conductive polymers are used as electrode material in secondary cells, it is important that the active polymer material is contacted via metals possessing good conductivity. This ensures that the active polymer material can be charged and discharged rapidly and uniformly. Attempts to apply anodically polymerizable monomers, such as pyrrole or thiophene, directly onto aluminum or other non-noble metals by electrochemical oxidation were unsuccessful since the metal was first oxidized and the resulting polymer film did not adhere firmly to the metal. Where aqueous electrolytes are used, non-conductive aluminum compounds are first formed, so that subsequent polymerization cannot take place completely.

It is an object of the present invention to provide a process for the preparation of laminates of metals and electrically conductive polymers, which permits the preparation of laminates which exhibit good adhesion between the metal and the conductive polymers, and also make it possible to produce laminates of non-noble metals, e.g. aluminum, and conductive polymers.

We have found that this object is achieved by a process for the preparation of laminates of metals and electrically conductive polymers, in which a continuous layer of an electrically conductive polymer is applied onto the surface of the metal by treating the monomers with an oxidizing agent, the coated metal is immersed in a solution which contains an anodically polymerizable monomer and a conductive salt, the coated metal is made the anode, and the monomer is anodically polymerized.

Other subjects of the invention are to be found in the detailed description below.

The process permits the preparation of a firmly adhering two-component laminate between a metal and an electrically conductive polymer, without it being necessary to pretreat the metal. For example, it is possible to use this process to produce composite electrodes in which the metal serves as a conductor and is first coated chemically with an electrically conductive polymer only in those areas in which it is intended to apply the active electrode material, after which the electrochemically active electrode material is applied by anodic polymerization of the monomers. For example, a light non-noble metal having a particularly large surface area, e.g. expanded aluminum metal, can be used as a conductor or as a support element for electrodes. This gives electrodes suitable for use in secondary cells, and a particularly high energy density can be achieved.

Suitable metals for producing the laminates are those conventionally used as electrical conductors, e.g. copper and copper alloys. The process is particularly suitable for laminates in which light, non-noble metals are used, e.g. aluminum or aluminum alloys.

First, a continuous layer of an electrically conductive polymer obtained by treating the polymer-forming monomers with an oxidizing agent is applied onto the metal. Such monomers which can be polymerized by means of oxidizing agents are, for example, compOundS frOm the class consisting of the five-membered heterocyclic compounds which possess a conjugated $\pi$-electron system and contain nitrogen, sulfur or oxygen as a herero atom. Examples of these compounds are compounds from the class consisting of the pyrroles, the thiophenes and the furans. Examples of suitable pyrroles are unsubstituted pyrrole itself, as well as N-substituted pyrroles, such as N-alkylpyrroles. However, other substituted pyrroles, such as 3,4-dialkylpyrroles or 3,4-dichloropyrroles, can also be used. Particularly suitable compounds from the class consisting of the thiophenes are unsubstituted thiophene itself and 2- or 3-alkylthiophenes, e.g. 2,3-diethylthiophene. These stated five-membered heterocyclic compounds can, however, also be polymerized together with other copolymerizable compounds, e.g. thiazole, oxazole or imidazole.

It is also possible to polymerize compounds such as aniline, benzidine, indole or carbazole by chemical oxidizing agents. Advantageously used oxidizing agents are oxygen-containing oxidizing agents, which may be used in amounts of from 0.2 to 10 moles per mole of the compound to be polymerized. Larger amounts of oxidizing agents are not necessary since the stated amount is sufficient to convert the total amount of starting material to the polymer. Polymerization of the monomers by means of oxygen-containing oxidizing agents is advantageously carried out in solution, water, if necessary mixed with an organic, water-miscible solvent, having proven a suitable solvent. However, it is also possible to use organic solvents, such as dimethyl sulfoxide, methanol, acetonitrile, ethylene carbonate, propylene carbonate, dioxane or tetrahydrofuran. Advantageously, the solutions contain from 0.1 to 50, preferably from 1 to 10, % by weight of the monomers to be polymerized. The amount of oxidizing agent to be added is assessed on the basis of the above principle. The oxidation is advantageously carried out from $-20°$ to $+80°$ C. Polymerization of these monomers is advantageously effected in the presence of a conductive salt, which is also referred to as a complexing agent or dopant. Examples of conductive salts which have proven useful are $KHSO_4$, $Na_2SO_4$, $HCOOH$, $LiCLO_4$, $HCLO_4$, $NEt_4CLO_4$, $NBu_4CLO_4$, $KALF_3$, $NaALF_6$, $KBF_4$, $K_2ZrF_6$, $K_2NiF_4$, $NO_2(NO_3)_2$, $H_2SO_4$, $FeCL_3$, $NOPF_6$, $KAsF_6$, $KsbF_6$, $KPF_6$ and $NBu_4PF_6$. The concentration of the conductive salt is such that not less than 1 mole of the conductive salts listed above is used per 3 moles of the monomer used or of the mixture of monomers.

The polymer is advantageously applied onto the metal by first applying a solution of the monomer and of the conductive salt onto the metal surface and then treating the solution with the oxygen-containing oxidizing agent.

Oxygen-containing oxidizing agents which have proven particularly useful are peroxoacids and their salts, such as peroxodisulfuric acid and its alkali metal and ammonium salts. Peroxoborates and peroxochromates, such as sodium perborate or potassium dichromate, are also preferably used. Permanganates, such as potassium permanganate are also useful if a small amount of acid is added to this permanganate. The use of hydrogen peroxide is also preferred, and in this case it is essential for a conductive salt to be present.

The metal covered or coated in this manner with a layer of electrically conductive polymer is then immersed in a solution which contains an anodically polymerizable monomer and a conductive salt, the coated metal being made the anode and the monomer being anodically polymerized so that the polymer layer forms on that already present. The anodically polymerizable monomers may be the same as those stated above. Hence, compounds from the class consisting of the pyrroles, the thiophenes and the anilines are suitable. It is also possible to apply, for example, aniline chemically as a polymer coating onto aluminum. To do this, the aluminum is wet beforehand with a solution of 10 % by volume of aniline in 10 ml of a 1:3 HCL/methanol mixture. A solution of the oxidizing agent is then applied.

The concentration of the monomer in the solvent is in general about 0.1 mole per liter of solvent, but may be lower or higher and may vary within wide limits. Advantageously, a concentration of 0.01 to 1 mole of monomer per liter of solvent is used.

Suitable electrolyte solvents are the above solvents. The polar organic solvents which are conventionally used for the anodic oxidation of the above heterocylic compounds and are capable of dissolving the monomers and the conductive salt are particularly suitable. The solvent itself should be very highly aprotic. Alcohols, ethers, such as 1,2-dimethoxyethane, dioxane or tetrahydrofurane, acetone, acetonitrile, dimethylformamide and propylene carbonate are preferred.

In the case of aniline, it is advantageous to employ an acidic electrolyte of pH O, e.g. 1 M $HCLO_4$, HCL, $HBI_4$ or $H_2SO_4$.

The conventional anionic or ionizable compounds likewise known per se for such anodic oxidation of the heterocyclic compounds or of the other monomers mentioned can be used as conductive salts, for example the above-mentioned conductive salts which may be present during the oxidation of the monomers with oxygen-containing oxidizing agents. Anions of aromatics containing acidic groups, for example substituted aromatic sulfonic acids and polysulfonic acids, are also suitable. Conductive salts which contain benzenesulfonate or toluylate anions are particularly preferred. The concentration of the conductive salt in the process is in general from 0.001 to 1, preferably from 0.01 to 0.1, mole per l of solvent.

The process can be carried in an electrolysis cell or electrolysis apparatus having an external direct current source, voltage source or potentiostats. The metal coated with conductive polymer is made the anode. The polymerization can be effected with a constant current (galvanostatically) or constant voltage (potentiostatically) or by varying the voltage (potentiodynamically), using direct or alternating current.

The cathode may consist, for example, of a different metal, such as platinum, molybdenum or tungsten, of stainless steel, nickel or titanium, of an alloy or of a carbon material (graphite, carbon fibers or glassy carbon).

The reaction temperature at which the process is operated has proven not to be critical and may therefore be varied within a wide range, provided that it does not fall below the solidification temperature of the electrolyte solvent or exceed the boiling point of the latter. In general, a reaction temperature of from −20° to 80° C. has proven advantageous, the process usually being carried out at room temperature (22°-24° C.). Otherwise, the conventional electrolysis conditions employed for such processes may be maintained. The voltage of the working anode at which the electrochemical polymerization takes place is advantageously from 0.5 to 3, preferably from 0.8 to 2, volt, measured against a saturated calomel reference electrode. A current density of from 0.01 to 100, preferably from 0.1 to 3.5, $mA/cm^2$ has proven advantageous. In general, a desirable thickness for the applied layer of conductive polymer is from 10 to 100 $\mu$m, the layer thickness depending on the duration of polymerization. The resulting coated metal is then washed with a solvent to remove adhering solvent, and may be dried. When intended for use as a battery electrode, drying is frequently dispensed with. In the laminates prepared according to the invention, the polymer is present as a complex cation of the polymer together with the counter anion of the conductive salt. Electrical conductivity of the polymer is in general from $10^{-2}$ to $10^2$ S/cm. Laminates of this type have various applications. They are used in particular as electrodes in electrical storage systems, such as batteries, which are rechargeable. They may also be employed as shielding material, as semiconductor components or as electrical conductors.

The Examples which follow illustrate the invention. In these Examples, parts and percentages are by weight.

EXAMPLE 1

The surface of an aluminum foil is wet with a solution of 7 parts of benzenesulfonic acid and 4 parts of pyrrole in 100 parts of methanol. Thereafter, a solution which contains 5 parts of sodium persulfate in a 1:1 mixture of methanol and water is applied onto the surface of the aluminum foil. After about 15 minutes, a thin, smooth, cohesive polymer film consisting of polypyrrole has formed. After drying, the polymer film cannot be removed from the aluminum surface with methanol or with a mixture of methanol and water.

The aluminum foil coated in this manner is then immersed in a solution of 5 parts of pyrrole and 7 parts of benzenesulfonic acid in 100 parts of methanol and is made the anode, while a metal electrode is used as the cathode and is arranged at a distance of 2.5 cm from the anode. A current density of 1 $mA/cm^2$ is employed. After 90 minutes, a 40 $\mu$m polymer layer has formed.

The coated aluminum foil can also be immersed in an aprotic electrolyte consisting of 0.5 M $LiCLO_4$ in propylene carbonate, in which 2 ml of pyrrole has been dissolved. The coated foil is again made the anode, and the pyrrole is polymerized as described above.

I claim:

1. A process for the preparation of a laminate of an aluminum or copper containing metal layer and an electrically conductive polymer which comprises:
    applying a solution of the polymer-forming monomer and a conductive salt onto the surface of the metal;
    treating the solution of the polymer-forming monomer and conductive salt with an oxidizing agent for a time sufficient to form a polymer of the selected monomer on the metal layer surface, and immersing the polymer film coated metal as an anode into a solution containing an anodically polymerizable monomer and a conductive salt, and applying a current to the solution to anodically polymerize the monomer and form an additional polymer film on the coated metal layer.

2. A process of claim 1, wherein the monomer treated with an oxidizing agent is a pyrrole.

3. A process of claim 1, wherein the anodically polymerizable monomer is a pyrrole.

4. The process of claim 1, wherein aluminum or an aluminum-containing alloy is used as the metal layer.

* * * * *